(12) United States Patent
Talayco

(10) Patent No.: US 8,015,290 B2
(45) Date of Patent: Sep. 6, 2011

(54) GROUP DRIVER

(75) Inventor: Daniel Talayco, Mountain View, CA (US)

(73) Assignee: Broadcom Corporation, Irvine, CA (US)

(*) Notice: Subject to any disclaimer, the term of this patent is extended or adjusted under 35 U.S.C. 154(b) by 946 days.

(21) Appl. No.: 11/408,064

(22) Filed: Apr. 21, 2006

(65) Prior Publication Data

US 2006/0259595 A1    Nov. 16, 2006

Related U.S. Application Data

(60) Provisional application No. 60/673,816, filed on Apr. 22, 2005.

(51) Int. Cl.
*G06F 15/173* (2006.01)
(52) U.S. Cl. ............... 709/226; 709/223; 370/390
(58) Field of Classification Search .......... 709/220–226; 370/390
See application file for complete search history.

(56) References Cited

U.S. PATENT DOCUMENTS

| | | | |
|---|---|---|---|
| 6,157,953 A * | 12/2000 | Chang et al. | 709/225 |
| 7,583,665 B1 * | 9/2009 | Duncan et al. | 370/389 |
| 7,844,733 B2 * | 11/2010 | Betts et al. | 709/242 |
| 2006/0133376 A1 * | 6/2006 | Valdevit | 370/390 |
| 2008/0056256 A1 * | 3/2008 | Cinghita et al. | 370/390 |
| 2009/0296565 A1 * | 12/2009 | Kuo et al. | 370/219 |

FOREIGN PATENT DOCUMENTS

JP    2006033384 A    *    2/2006

OTHER PUBLICATIONS

"Dynamic Determination of Network Topology." IBM Technical Disclosure Bulletin. Mar. 1, 1995. 411-418.*

* cited by examiner

*Primary Examiner* — Jeffrey R Swearingen

(57) ABSTRACT

The invention is a method system and apparatus for a group driver. In the event that a system-wide application is needed, a plurality of devices that belong to the system are identified and divided into groups. The groups include a processor and at least one device such as a switch. Once the groups are determined, the system-wide application is transmitted to the devices via the group processors.

12 Claims, 5 Drawing Sheets

GROUP DRIVER

CROSS-REFERENCE TO RELATED APPLICATIONS

This application claims priority of U.S. Provisional Patent Application No. 60/673,816, filed on Apr. 22, 2005. The subject matter of this earlier filed application is hereby incorporated by reference.

BACKGROUND OF THE INVENTION

1. Field of the Invention

The present invention relates to devices, software applications and networks that utilize data that is sent or received over data communications or computer networks.

2. Description of the Related Art

As computer performance has increased in recent years, the demands on computer networks have significantly increased; faster processors and higher memory capabilities need networks with high bandwidth capabilities to enable high speed transfer of significant amounts of data.

Based upon the Open System Interconnect (OSI) 7-layer reference model, network capabilities have grown through the development of repeaters, bridges, routers and switches, which operate with various types of communication media. Collectively, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which media access controller (MAC) address exist on which ports of the bridge, and pass packets that are destined for an address which is located on an opposite side of the bridge. Bridges sometimes utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are flexible and are able to provide the needed capacity through the combination of multiple network devices. For example, a network device having eight ports may be linked with one or more similar network devices to provide the capacity of the multiple ports of the linked devices. While the combination of multiple network devices may be ideal in meeting capacity requirements, but the combination of the network devices, the combination of the network devices also results in other issues. One such issue is that each network device has its own means for determining the destination port for a received datagram and those means must be synchronized to provide efficient operation. While the prior art network devices and methods provide many of these attributes, there is a need for network devices that may be used together to provide the capacity needed by the implementers and provide efficiency in handling of datagrams.

When establishing secure sessions between entities involved in sending messages according to a protocol, additional messaging is needed to setup the security context that is used to secure the messaging. This is an additional overhead particularly when dealing with wireless networks and using over the air communication for setting up security contexts that are needed for providing secure communication. For example, a normal TLS session between two nodes would require a prior handshake protocol (4 messages) that sets up the context that will be used to secure messages between the two nodes using the TLS session. When several sets of such sub-sessions take place within the context of a protocol message exchange it represents significant overhead. Thus, there is a need for a modified process and apparatus by which this overhead can be reduced in many scenarios, while still providing the same level of security.

DETAILED DESCRIPTION OF THE PREFERRED EMBODIMENT(S)

Figure 1:
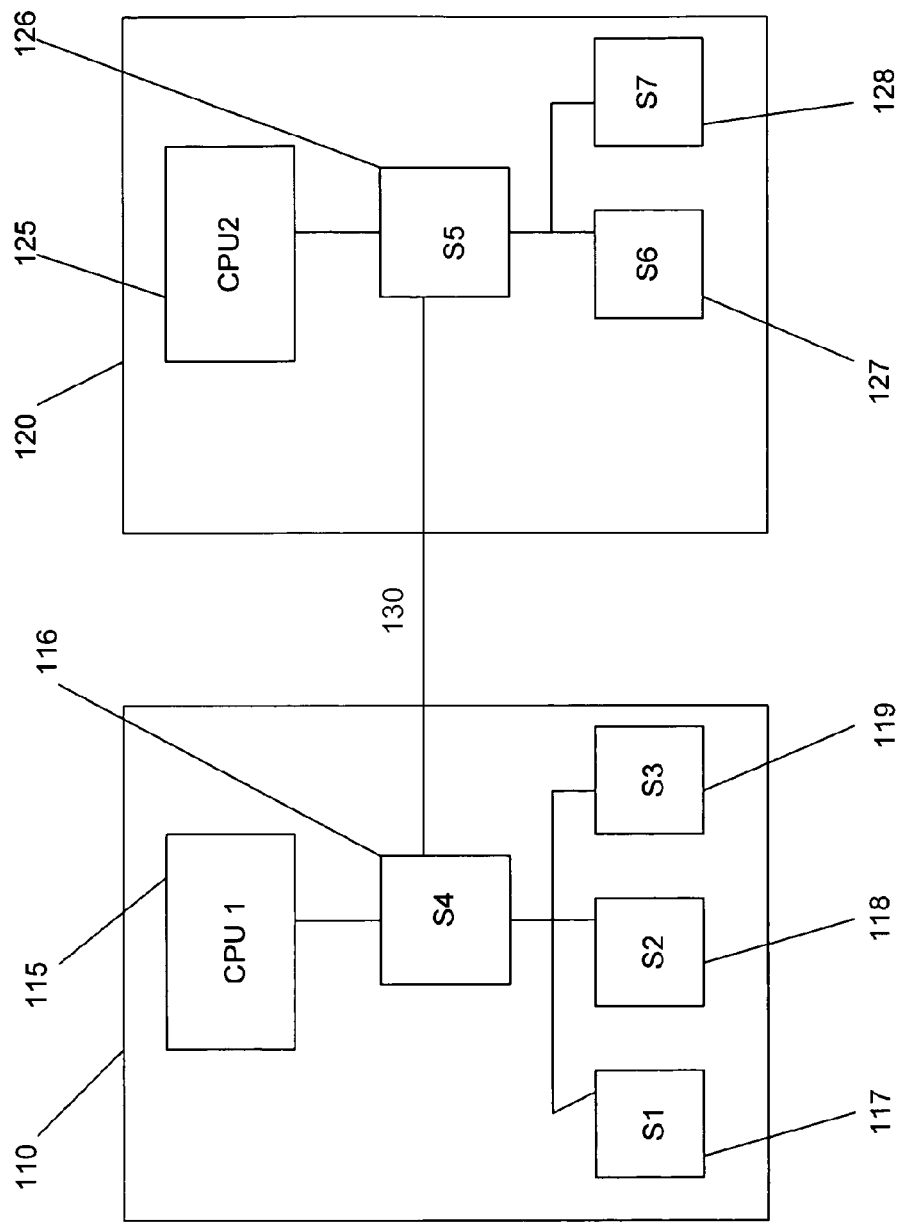
FIG. 1 represents an exemplary configuration of network devices.
Figure 2:
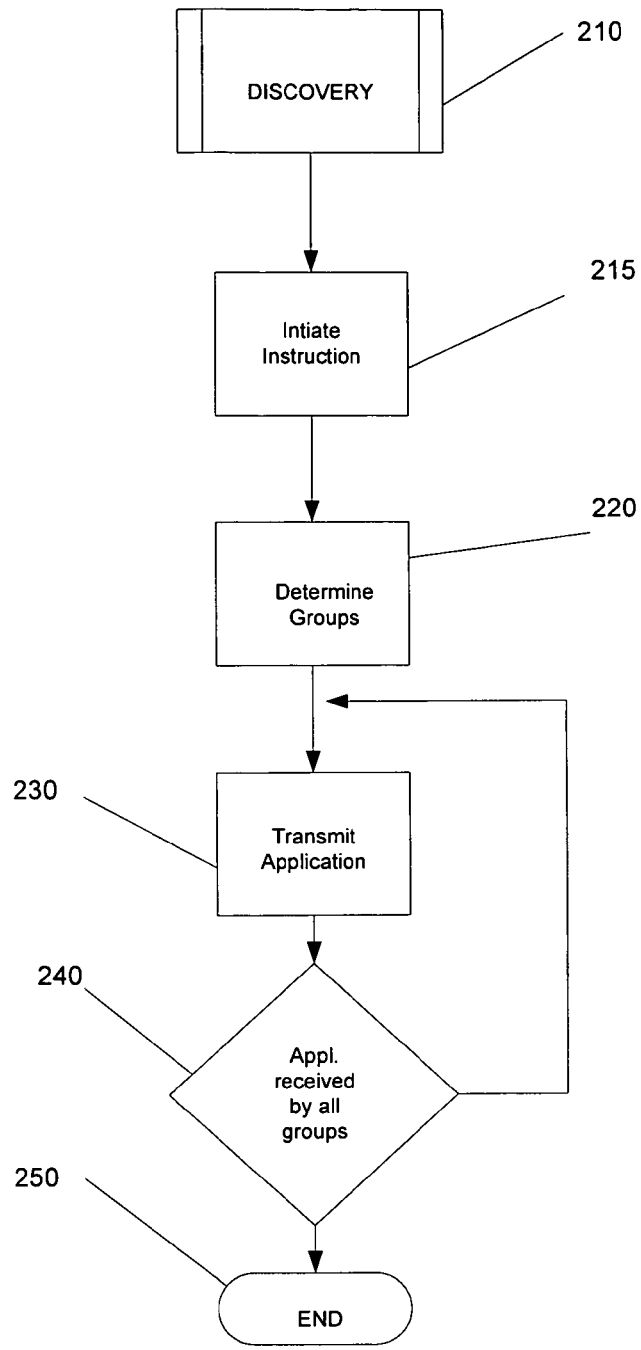
FIG. 2 is flow diagram illustrating an exemplary embodiment of the present invention.

FIG. 1 represents an exemplary configuration of network devices and FIG. 2 is flow diagram of an example of a method according to the present invention. According to an embodiment of the invention, a system includes a plurality of connected or stacked network devices 110 and 120. For example, each of the stacked network devices is a board that includes a processor such as a central processing unit (CPU) 115, and a plurality of network switches S1 117, S2 118, S3 119 and S4 116. In the exemplary embodiment illustrated in FIG. 1, the network switches S1-S4 are connected to CPU 115. Similarly, network switches S5-S7 are connected to CPU 125.

In the illustrated example of the invention, the processor of a network device and associated switches form a group. For example, switches S1-S4 of the group 110 are addressable through the processor 115 of group 110. Therefore, if an application is to run on the switches S1-S4 that belong to the group 110, the application is transmitted to the switches S1-S4 of the group 110 by the processor 115 of group 110. Similarly, switches S5-S7 of the group 120 are addressable through the processor 125 of group 120. Therefore, if an application is to run on the switches S5-S7 that belong to group 120 the application is transmitted to the switches S5-S7 of the group 120 by the processor 125 of the second group 120.

The group processors can transmit system-wide applications or instructions between the processors within a system. The processor of each group is responsible for forwarding the applications to the switches of its group and reporting the success or failure of the transmission. For example as shown in FIG. 1, a first group 110 includes processor 115 and switches S1-S4. Similarly a second group 120 includes processor 125 and switches S5-S7. In order to form a system, the groups are connected together, or stacked. For example, group 110 is connected to group 120 via connection 130. In other embodiments, the groups are network cards that interconnected through connections within a box or structure.

Figure 3A:
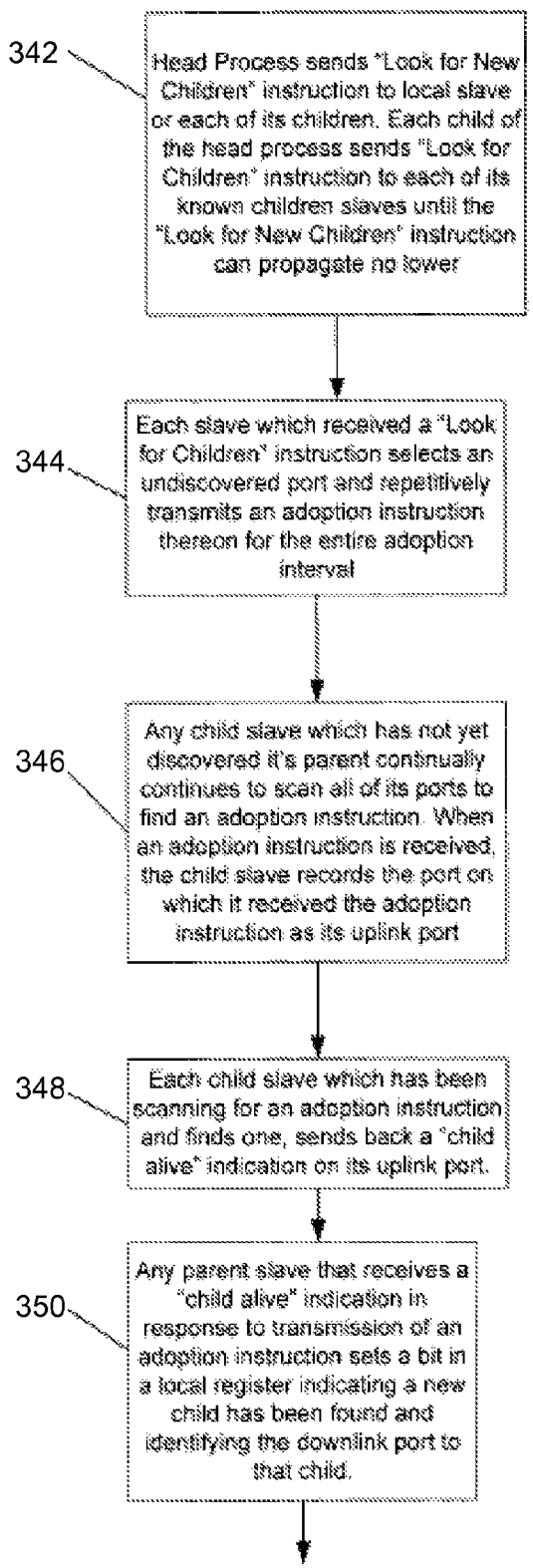
FIGS. 3A and 3B are a system block diagram of an exemplary topology discovery process.
Figure 3B:
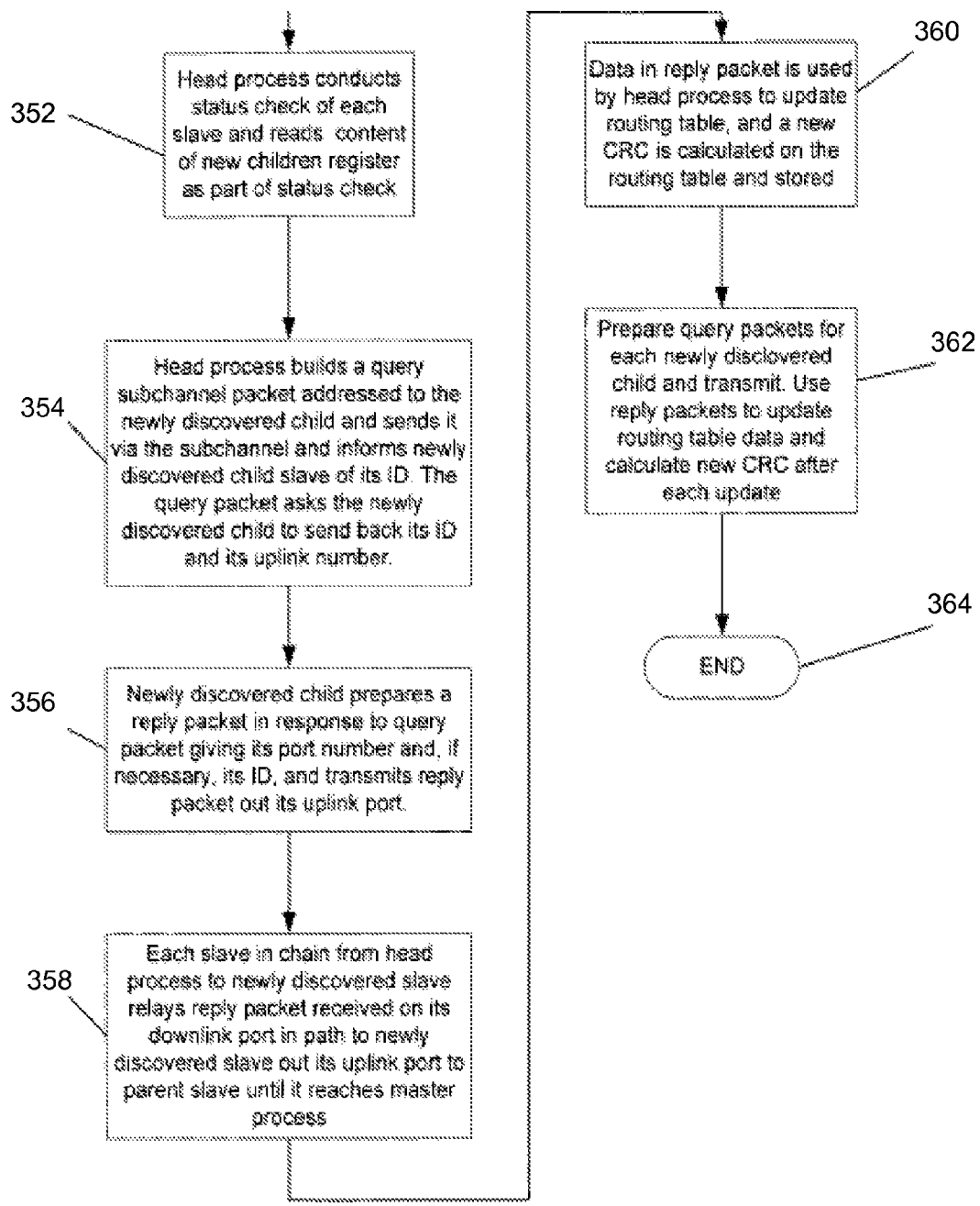

FIG. 2 is a flow diagram that illustrates a method or system according to an embodiment of the present invention. As discussed above, a plurality of stacked network groups form a system. Thus, the configuration of the system (topology) has to be discovered at 210 and the groups determined. The topology of the system can be discovered either manually or automatically. At this time, the system identifies all of the processors 115 and 125 in the system, which correspond to groups 110 and 120 respectively, that belong to the system. An example of the topology discovery process is described below with reference to FIGS. 3A and 3B. In this example, a head or master device is selected from the plurality of group devices. The remaining devices form a device hierarchy which includes children slave devices.

When the routine is called, processing begins at step 342 wherein a head process sends a Look call to each of its children or slaves. Each child slave forwards the inquiry to each of its known children, and the process continues until the "Look for new children" primitive can propagate no lower in the hierarchy.

Each slave device that receives the "Look for new children" primitive reacts in the same way to begin searching for new children slaves on any ports remaining in the slave which do not have known children attached thereto. Only one "undiscovered" port (meaning no known child attached thereto) is used for interrogation during each timeslot in each slave. In other words if a first slave device has two known children and two undiscovered ports, and a second slave device has no known children and 3 undiscovered ports, during the topology discovery process, each of the first and second slaves are going to interrogate only one of their undiscovered ports with only a single multiplexer. Interrogation of one of the undiscovered ports is accomplished by repetitively transmitting an adoption instruction out the selected undiscovered port using the subchannel transmitter for the entire adoption period, i.e., an entire timeslot devoted to topology discovery. The adoption instruction basically indicates to any child that receives it, "Hello, I am ID _____, and I will be your parent." This process of interrogating one undiscovered port for a new child is shown by block 344.

Any child slave which has not yet found its parent will be scanning all of its ports at a high rate to find such an adoption instruction. When it receives an adoption instruction, the new child slave records the port number it received it on as its uplink port in its configuration data, as shown by block 346.

Next, any child slave which has newly discovered its parent sends back a "child alive" indication on its uplink port, as shown by block 348. The "child alive" indication is the same for every child slave and contains no information specific to that child slave such as its ID or it could contain the port number of the slave's uplink port.

Any slave which receives a "child alive" indication in response to the transmission of an adoption instruction responds by setting a bit in a register therein. This bit indicates that a new child has been found and indicates on which downlink port it was found, as illustrated by block 350.

On a subsequent call of the topology discovery subroutine, the head process conducts a status check of each slave and gather status information from each slave. Part of this status information is the content of the "new children" register which has the bit set in it indicating a new child has been found, as illustrated in block 352. This status check can take any form such as a poll of all known children by sending a query packet to each one using appropriate routing instructions from the routing table and requesting that the contents of the register be sent back to the head process.

The content of the new children register of any slave which has found new children is used to update the topology data stored by the head process. Since the position of the bit in the "new children" register indicates the downlink port number, the head process has all the information it needs to build a query packet to the newly discovered child, and this is done either on the same pass through the subroutine or on a subsequent pass. This processing is represented by block 264. The process of building the subchannel query packet addressed to the newly discovered child using routing data gleaned from the data obtained from the status check of the parent that discovered the new child and sending it via the subchannel is represented by block 354. The query packet informs the newly discovered child slave of what ID has been assigned to it. The routing fields are the same as explained elsewhere herein. This query packet asks the slave to send back its ID and its uplink port number in embodiments where the ID of every slave is fixed or just its uplink port number where the ID has been assigned although if multiple new child slaves have been discovered, the reply packets should each include the ID even if the master node assigned it to each child slave so that replies from different slaves can be kept straight. In the preferred embodiment, the ID is assigned by the head process and the new slave is informed of its ID in the query packet.

The newly discovered child receives this query packet and responds by generating an upstream packet which contains its uplink port number and, if necessary, its ID, as symbolized by block 356. This upstream packet needs no routing instructions since all slaves in the chain from the head to it still have their multiplexers tuned to the downlink ports used to relay the query packet to the newly discovered slave and will remain tuned to that port until the reply packet has been received and relayed out the uplink port to the parent slaves all the way up to the head process, as represented by block 358. This aspect of the process works the same as subchannel transmissions of packets to process NMS get and set operations.

The uplink port number or ID in the reply packet are used by the head process to update the routing table, and then a new CRC is calculated on the routing table and stored, as symbolized by block 360.

The process of preparing query packets for any other newly discovered children and sending them and receiving the reply packets and updating the routing table and calculating a new CRC upon each update is symbolized by block 362. That ends the automatic topology discovery process.

Referring again to FIG. 2, the method or system next initiates an application or instruction that is applicable to at least a portion of the devices or switches in the system 215. For example, an application, or system-wide communication, that is running on the processor of a group that needs to affect at least a portion of the remaining devices, in this example the switches, in the system. An example of a system-wide communication is function call to create a virtual LAN, such as bcn_vlan_create (Si, 17), where Si is S1-S7 are the devices or switches that are affected by this function call.

The method or system next transmits the system-wide application to all of the devices that belong to system. According to an embodiment of the invention, the transmission of the application is accomplished by transmitting the application to the switches S1-S7, by a series of instructions such as:

```
Bcn_vlan_create (S1, 17)
Bcn_vlan_create (S2, 17)
Bcn_vlan_create (S3, 17)
    .
    .
Bcn_vlan_create (S7, 17)
```

However, the above process will result in excess processor resources and link bandwidth because only one device at a time is addressed. Accordingly, the device that is sending the system-wide application must be aware of every device within the system. In order to reduce the amount of processor resources and bandwidth that is utilized during this process, according to an exemplary embodiment of the invention, the application is transmitted to the remaining devices by a single instruction.

In an exemplary embodiment, the invention takes advantage of the division of devices into groups. Thus, the device that is distributing the system-wide application needs only to know about, or discover, the processors within the system. According to this embodiment, the application is transmitted from one processor to the remaining discovered processors of the system. For example, if the system-wide application is running on processor 115, a single command is transmitted only from processor 115 to processor 125.

The processors 115 and 125 will next transmit the application to the switches of its particular group 230. For example, when processor 125 receives the system-wide application from processor 115, processor 125 transmits the application to switches S5 126, S6 127 and S7 128 that belong to its group 120. An example of a single system-wide instruction that may be sent by processor 120 to processor 110 is:

Bcmx_vlan_create 17

This instruction is forwarded to the processors within the system, which will in turn forward the instruction to the switches within the processor's group.

According to another exemplary embodiment of the invention, a central or master network device or group, is selected to distribute or transmit a system-wide application to the other groups within the system. According to an embodiment of the invention, the master will discover the system topology.

The master will analyze the configuration information in the database. During the analysis, the master will determine how to avoid loops in the system, and will generate a map of the system-wide connections. The master will then send the result of the analysis, to all the other network devices in the stack.

Referring again to FIG. 2, the process is complete when each of the system groups indicates the status, for example a success or failure, of the application transmission 240. The processors that are supposed to have received the system-wide application transmit a return code to the processor that sent the application. For example, if processor 110 sent the application, processor 120, upon receipt of the application will send a return code to processor 110 indicating a success or failure of the application. One all groups report that the transmission of the application was successful, the process is complete 250.

Figure 4:
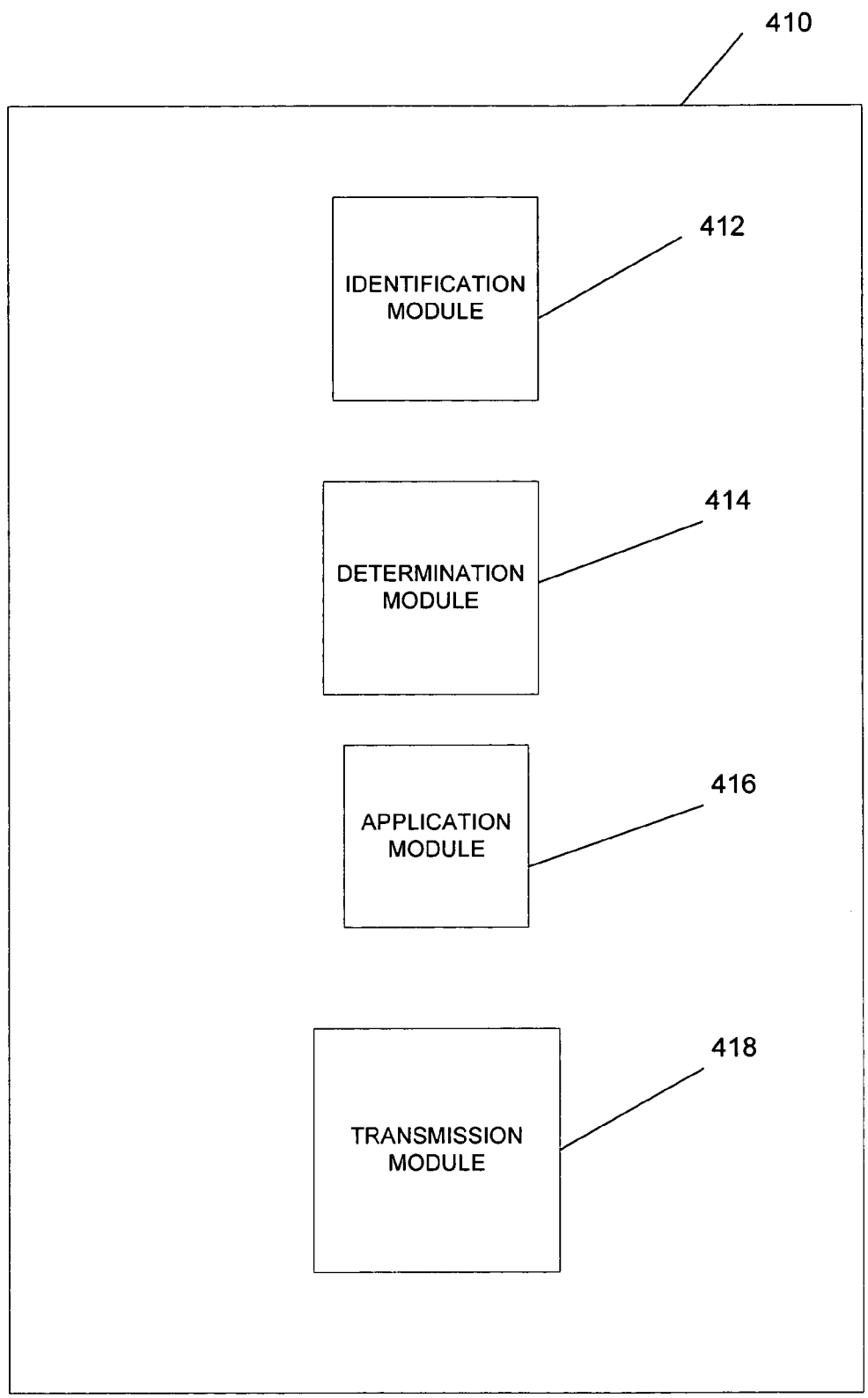
FIG. 4 is a system diagram of a group driver system.

FIG. 4 is a system block diagram according to an exemplary embodiment of the invention. As shown in FIG. 4, the group driver system 410 comprises a identification module 412. The identification module 412 identifies a system topology. The system topology includes a plurality of connected network devices. Once the topology of the system is identified, a determination module 414 determines a plurality of groups. The groups comprise the plurality of network devices. These network devices are divided into groups. In this example, a group consists of a processor and at least one switch. However, one skilled in the art would recognize that the groups can be configured in several different ways.

The group driver system 410 according to this exemplary embodiment, further includes an application module 416. The application module 416 initializes a system-wide application that will be distributed to the system network devices that were identified during the topology discovery process.

The group driver system 410 further includes a transmission module 418. The transmission module 418 transmits the system-wide application to the network devices within the system in one instruction. In another embodiment of the invention, the transmission module transmits the system-wide application to the processors of the network groups in the single instruction. The processors of the groups are then responsible for transmitting the application to the devices within its group.

One having ordinary skill in the art will readily understand that the invention as discussed above may be practiced with steps in a different order, and/or with hardware elements in configurations which are different than those which are disclosed. For example, the present invention may be implemented at least as a computer product including computer-readable code, a chip set or ASIC, or a processor configured to implement the method or system. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method for transmitting an application between multiple devices arranged in a stacked configuration, the method comprising:

determining a topology for a system, wherein the system comprises multiple groups of switches arranged in a stacked configuration, wherein each group of switches comprises a processor and multiple switches, wherein determining the topology includes:
propagating an instruction to known child nodes to look for new child nodes,
receiving a reply from the new child nodes,
registering the new child nodes including a downlink port to each of the new child nodes, and
updating a routing table for the topology for the system;

initializing an application for distribution to each of the groups of switches;

transmitting the application from a single processor in one of the groups to each of the processors in the other groups using a single instruction, wherein the processors in the other groups propagate the application to the multiple switches within their respective groups; and receiving a code at the single processor that transmitted the application from each of the processors in the other groups, wherein the code indicates a success or failure of the application transmission.

2. The method of claim 1 further comprising designating one of the groups as a master group to transmit applications to the other groups.

3. The method of claim 2 wherein determining the topology for the system comprises determining the topology for the system by the master group.

4. The method of claim 1 wherein the application comprises a function call to create a virtual local area network (LAN).

5. A system for transmitting an application between multiple devices arranged in a stacked configuration, the system comprising:
 multiple groups of switches arranged in a stacked configuration, wherein each group of switches comprises a processor and multiple switches;
 an identification module that is configured to determine a topology for a system, wherein the identification module determines the topology for the system by:
  propagating an instruction to known child nodes to look for new child nodes,
  receiving a reply from the new child nodes,
  registering the new child nodes including a downlink port to each of the new child nodes, and
  updating a routing table for the topology for the system;
 an application module that is configured to initialize an application for distribution to each of the groups of switches; and
 a transmission module that is configured to transmit the application from a single processor in one of the groups to each of the processors in the other groups using a single instruction, wherein the processors in the other groups propagate the application to the multiple switches within their respective groups and wherein the transmission module is further configured to receive a code at the single processor that transmitted the application from each of the processors in the other groups, wherein the code indicates a success or failure of the application transmission.

6. The system of claim 5 wherein the identification module is further configured to designate one of the groups as a master group to transmit applications to the other groups.

7. The system of claim 6 wherein the master group is configured to determine the topology for the system.

8. The system of claim 5 wherein the application comprises a function call to create a virtual local area network (LAN).

9. An apparatus for transmitting an application between multiple devices arranged in a stacked configuration, the apparatus comprising:
 means for determining a topology for a system, wherein the system comprises multiple groups of switches arranged in a stacked configuration, wherein each group of switches comprises a processor and multiple switches, the means for determining the topology includes:
  propagating an instruction to known child nodes to look for new child nodes,
  receiving a reply from the new child nodes,
  registering the new child nodes including a downlink port to each of the new child nodes, and
  updating a routing table for the topology for the system;
 means for initializing an application for distribution to each of the groups of switches; and
 means for transmitting the application from a single processor in one of the groups to each of the processors in the other groups using a single instruction, wherein the processors in the other groups propagate the application to the multiple switches within their respective groups and wherein the means for transmitting the application is further configured to receive a code at the single processor that transmitted the application from each of the processors in the other groups, wherein the code indicates a success or failure of the application transmission.

10. The apparatus of claim 9 wherein the means for determining the topology is further configured to designate one of the groups as a master group to transmit applications to the other groups.

11. The apparatus of claim 10 wherein the master group is configured to determine the topology for the system.

12. The apparatus of claim 9 wherein the application comprises a function call to create a virtual local area network (LAN).

* * * * *